United States Patent
Nakao et al.

(10) Patent No.: US 10,814,289 B2
(45) Date of Patent: Oct. 27, 2020

(54) SEPARATION MEMBRANE, SEPARATION MEMBRANE ELEMENT AND SEPARATION MEMBRANE MODULE

(71) Applicant: TOYOBO CO., LTD., Osaka-shi, Osaka (JP)

(72) Inventors: Takahito Nakao, Otsu (JP); Mayumi Akashi, Otsu (JP); Miyuki Yao, Otsu (JP); Seiji Watanuki, Otsu (JP); Tooru Kitagawa, Otsu (JP)

(73) Assignee: TOYOBO CO., LTD., Osaka-shi, Osaka (JP)

( * ) Notice: Subject to any disclaimer, the term of this patent is extended or adjusted under 35 U.S.C. 154(b) by 398 days.

(21) Appl. No.: 15/516,969

(22) PCT Filed: Oct. 6, 2015

(86) PCT No.: PCT/JP2015/078331
§ 371 (c)(1),
(2) Date: Apr. 5, 2017

(87) PCT Pub. No.: WO2016/056547
PCT Pub. Date: Apr. 14, 2016

(65) Prior Publication Data
US 2017/0296985 A1    Oct. 19, 2017

(30) Foreign Application Priority Data
Oct. 7, 2014   (JP) .................................. 2014-206498

(51) Int. Cl.
*B01D 71/52* (2006.01)
*B01D 63/02* (2006.01)
(Continued)

(52) U.S. Cl.
CPC .......... *B01D 71/52* (2013.01); *B01D 61/002* (2013.01); *B01D 63/02* (2013.01); *B01D 69/02* (2013.01);
(Continued)

(58) Field of Classification Search
None
See application file for complete search history.

(56) References Cited

U.S. PATENT DOCUMENTS

| 7,150,830 B1 | 12/2006 | Katsube et al. |
| 2004/0023017 A1 | 2/2004 | Nagoya et al. |

(Continued)

FOREIGN PATENT DOCUMENTS

| JP | 61-136402 A | 6/1986 |
| JP | 3008886 B2 | 2/2000 |

(Continued)

OTHER PUBLICATIONS

International Search Report dated Jan. 12, 2016, issued in counterpart International Application No. PCT/JP2015/078331 (2 pages).

*Primary Examiner* — Krishnan S Menon
(74) *Attorney, Agent, or Firm* — Westerman, Hattori, Daniels & Adrian, LLP

(57) ABSTRACT

[Problem] To provide a membrane for the forward osmosis method, which keeps a high porosity, reduces concentration polarization by appropriately controlling the pore distribution, achieves both high water permeability and a self-supporting property, and has high chemical durability such that are membrane is applicable to various draw solutions. [Solution] A separation membrane having a structure inclined from an outer surface side to an inner surface side, a ratio between a thickness of a dense layer having a dense polymer density and a thickness of a coarse layer having a coarse polymer density being in a range of 0.25≤(the thick-
(Continued)

ness of the coarse layer)/[(the thickness of the dense layer)+ (the thickness of the coarse layer)]≤0.6, when measuring polymer density distribution in a thickness direction of the separation membrane by Raman spectroscopy.

6 Claims, 6 Drawing Sheets

(51) Int. Cl.
    *B01D 69/08*     (2006.01)
    *B01D 71/68*     (2006.01)
    *C08G 65/40*     (2006.01)
    *B01D 69/02*     (2006.01)
    *B01D 71/80*     (2006.01)
    *B01D 61/00*     (2006.01)
    *B01D 69/12*     (2006.01)
    *C02F 1/44*     (2006.01)
    *C08G 75/23*     (2006.01)
    *C02F 101/12*     (2006.01)
    *C02F 103/08*     (2006.01)

(52) U.S. Cl.
    CPC .............. *B01D 69/08* (2013.01); *B01D 69/12* (2013.01); *B01D 71/68* (2013.01); *B01D 71/80* (2013.01); *C02F 1/445* (2013.01); *C08G 65/4056* (2013.01); *C08G 75/23* (2013.01); *B01D 2325/023* (2013.01); *B01D 2325/04* (2013.01); *B01D 2325/14* (2013.01); *B01D 2325/36* (2013.01); *B01D 2325/38* (2013.01); *C02F 2101/12* (2013.01); *C02F 2103/08* (2013.01); *C08G 2340/00* (2013.01); *Y02A 20/131* (2018.01)

(56) References Cited

U.S. PATENT DOCUMENTS

| 2006/0144777 A1 | 7/2006 | Kumano et al. |
| 2012/0175300 A1 | 7/2012 | Herron |
| 2015/0136692 A1 | 5/2015 | Higashi et al. |

FOREIGN PATENT DOCUMENTS

| JP | 3591618 B2 | 11/2004 |
| JP | 4277147 B2 | 6/2009 |
| JP | 4412486 B2 | 2/2010 |
| JP | 2013-31836 A | 2/2013 |
| JP | 2013-76024 A | 4/2013 |
| JP | 2014-508637 A | 4/2014 |
| JP | 2014-514150 A | 6/2014 |
| WO | 03/026779 A1 | 4/2003 |
| WO | 2008/137082 A1 | 11/2008 |
| WO | 2012/097386 A2 | 7/2012 |
| WO | 2012/146629 A1 | 11/2012 |
| WO | 2013/005551 A1 | 1/2013 |
| WO | 2013/156598 A1 | 10/2013 |

FIG.2

| RANGE | NUMBER OF CORRESPONDING POINTS |
|---|---|
| $0 < x \leq 373.9$ | 2 |
| $373.9 < x \leq 747.8$ | 7 |
| $747.8 < x \leq 1121.7$ | 4 |
| $1121.7 < x \leq 1495.6$ | 3 |
| $1495.6 < x \leq 1869.5$ | 1 |
| $1869.5 < x \leq 2243.4$ | 2 |
| $2243.4 < x \leq 2617.3$ | 2 |
| $2617.3 < x \leq 2991.2$ | 2 |
| $2991.2 < x \leq 3365.1$ | 3 |
| $3365.1 < x \leq 3739$ | 19 |

SEPARATION MEMBRANE, SEPARATION MEMBRANE ELEMENT AND SEPARATION MEMBRANE MODULE

TECHNICAL FIELD

The present invention relates to a separation membrane, a separation membrane element and a separation membrane module, which are composed of a material having excellent chemical durability, achieve both excellent separation property and high water permeability, and are particularly suitable for forward osmosis treatment.

BACKGROUND ART

In recent years, application of the water treatment technique using a membrane separation method has been increasing. In a water treatment method using a reverse osmosis method or a nanofiltration method, cellulose or polyamide is used as a membrane material, and a pressure equal to or higher than an osmotic pressure of a feed liquid is applied to the feed liquid side, thereby allowing selective permeation of water and the like without allowing permeation of a substance to be separated in the feed water.

On the other hand, a forward osmosis method is a water treatment method for recovering the water and the like in a feed liquid into a draw solution which is a hyperosmotic solution through a separation membrane composed of cellulose, polyamide or the like. The water and the like recovered into the draw solution may be separated from the draw solution (solute) in a subsequent step, or may be used as it is. Unlike the reverse osmosis method, the forward osmosis method does not require the treatment at high pressure, the piping that can withstand high pressure, and the like in the above-described step of recovering the water and the like from the feed liquid to the draw solution side. Therefore, the initial investment cost and the running cost for operation can be reduced. On the other hand, in the step of recovering the water from the draw solution, the membrane separation operation and the thermal separation operation are performed, and thus, the treatment at high pressure and the treatment at high temperature are required. Namely, a solute not only having an osmotic pressure sufficiently higher than an osmotic pressure of the feed liquid but also easily separated from the draw solution is selected as the solute used in the draw solution, so that the cost of the forward osmosis method can be reduced as compared with that of the reverse osmosis method and the nanofiltration method.

Furthermore, unlike the reverse osmosis method, the pressure is not applied to the feed liquid side in the forward osmosis method. Therefore, the forward osmosis method has an advantage that the number of collisions of a membrane contaminant in the feed liquid with a membrane surface is small and the membrane surface contamination (fouling) risk is low in the case of obtaining a quantity of treated water equivalent to that of the reverse osmosis method. Therefore, as compared with the reverse osmosis method that requires a multiple-stage pretreatment step prior to a membrane treatment step, the number of pretreatment can be reduced or the forward osmosis membrane treatment step can be performed without the pretreatment step.

On the other hand, development of a membrane suitable for the forward osmosis method is hardly proceeding, and a membrane exhibiting high water permeability in the reverse osmosis method is used and tested at present. However, in the forward osmosis method, it is difficult to completely block permeation of the solute (draw solute) in the draw solution through the membrane, and thus, the draw solute having permeated from the draw solution side to the feed liquid side stays in the membrane and causes concentration polarization, which results in a decease in effective osmotic pressure difference through the membrane and thus a significant decrease in quantity of water permeation. In addition, the membrane for the reverse osmosis method has a membrane structure optimized to obtain a large quantity of water permeation when the pressure is applied to the feed liquid side, and cannot exhibit high water permeability at the time of treatment under atmospheric pressure as in the forward osmosis method.

In order to prevent the decrease in quantity of water permeation caused by concentration polarization, PTD 1 discloses the technique of forming a polyamide thin membrane on a support membrane having a highest possible porosity by an interfacial polymerization method.

In addition, as a reverse osmosis membrane material other than polyamide that is applicable to the forward osmosis method, PTD 2 discloses an asymmetric hollow fiber membrane including cellulose.

According to the polyamide composite membrane described in PTD 1, attention is focused on a salt staying in the support membrane that supports the active layer, and an effort is made to increase the porosity of the support membrane and thereby bring the structure of the polyamide composite membrane closer to a membrane structure that is suitable as a membrane for the forward osmosis method, makes the salt stay less likely and can reduce the concentration polarization. However, the composite membrane having the support membrane and the active layer needs to have a certain level of mechanical strength from the perspective of manufacturing, and thus, the composite membrane has the support membrane having a thickness of several tens of micrometers or more and a non-woven fabric support sheet further supporting the support membrane. Therefore, however higher the porosity of the support membrane is, permeation of the draw solute in a thickness direction of the support membrane and the non-woven fabric support sheet requires more time, and as a result, the stay of the draw solute can be reduced only slightly. Also disclosed is the technique of not having a non-woven fabric support sheet, forming a support layer composed of nanofibers having a very high porosity, and forming a polyamide separation function layer on the support layer. However, the nanofibers do not have a self-supporting property and industrial production thereof is extremely difficult.

The cellulose asymmetric membrane described in PTD 2 is a hollow fiber-like membrane and has a self-supporting property, and thus, can be formed to have a thickness smaller than that of the composite membrane. However, the cellulose asymmetric membrane has a relatively low porosity, and thus, has such a membrane structure that the stay of the draw solute causing concentration polarization is likely to occur. In addition, a pH range in which the cellulose asymmetric membrane can operate while maintaining the membrane performance is narrow, and thus, the usable draw solute is limited when the cellulose asymmetric membrane is used in the forward osmosis method.

As described above, the conventional polyamide composite membrane and cellulose asymmetric membrane have problems of the decrease in quantity of water permeation caused by concentration polarization and the chemical durability, and thus, are not necessarily suitable. Therefore, what is desired is a membrane having high chemical durability, having appropriate pore distribution, having a membrane thickness of approximately several tens of micrometers or smaller, and having a self-supporting property.

CITATION LIST

Patent Document

PTD 1: International Publication No. 2008/137082
PTD 2: Japanese Patent Laying-Open No. 61-136402

SUMMARY OF INVENTION

Technical Problem

The present invention has been made to solve the above-described problems and an object thereof is to provide a membrane for the forward osmosis method, which has a high porosity, reduces concentration polarization by appropriately controlling the pore distribution, achieves both high water permeability and a self-supporting property, and has high chemical durability such that the membrane is applicable to various draw solutions.

Solution to Problem

Conventionally, cellulose acetate and polyamide have been used as membrane materials for reverse osmosis and nanofiltration. These membranes are excellent in ion exclusion ability, and thus, can also be used in the forward osmosis application. However, unlike the performance required for a reverse osmosis membrane, the performance required for a forward osmosis membrane is such that the membrane can operate using various draw solutes and that the membrane exhibits high water permeability even in the case of operation under atmospheric pressure as in forward osmosis.

As for a cellulose acetate asymmetric membrane, of two types of commercially available reverse osmosis membranes, an applicable pH range is narrow, and thus, not all of the draw solutions can be used and the industrial applicability as a forward osmosis membrane is relatively narrow. On the other hand, a polyamide composite flat sheet membrane is generally fabricated by a method for forming a support layer on a non-woven fabric support sheet and further forming a polyamide active layer on the support layer by interfacial polymerization. The non-woven fabric support sheet and the support layer need to have a certain level of strength and thickness in order to keep a self-supporting property of the flat sheet membrane. A problem in the case of operation in accordance with forward osmosis is a decrease in quantity of water permeation caused by the draw solute staying in these support layer and non-woven fabric support sheet, and thus, an effort is made to increase a porosity of the support layer. However, since the self-supporting property must be kept, the thickness cannot be reduced, and as a result, the effect of reducing concentration polarization by increasing the porosity is small.

As a result of earnest study, the inventors of the present invention has focused attention on sulfonated poly(arylene ether) (SPAE) as a membrane material having the ion exclusion ability and high chemical durability and being usable as a forward osmosis membrane. SPAE has a repeating structure including, as repeating units, a hydrophobic segment represented by the following formula (I) and a hydrophilic segment represented by the following formula (II), for example. Such SPAE has a high mechanical strength because the hydrophobic segment has strong cohesive force.

In addition, such SPAE exhibits excellent ion separability because swelling of the membrane in a water-containing state is small.

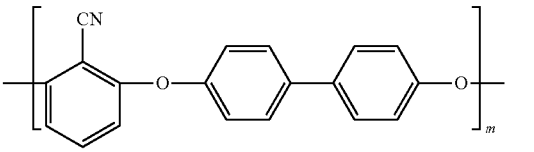

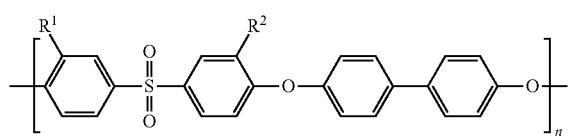

In the above-described formulas, m and n each represents a natural number equal to or greater than 1, $R^1$ and $R^2$ represent —$SO_3M$, M represents a metal element, and a ratio of sulfonation expressed as a percentage of the number of repetition of the formula (II) to a total of the number of repetition of the formula (I) and the number of repetition of the formula (II) in a sulfonated poly(arylene ether) copolymer is higher than 10% and lower than 50%.

Development of a membrane composed of SPAE, suited for the forward osmosis method and achieving both high rejection and high water permeability has been aimed. Generally, a separation membrane has a tradeoff relationship between the rejection and the water permeability, and thus, it is difficult to simultaneously achieve these two elements at high level. Namely, when the membrane is formed under the conditions for increasing the porosity in order to obtain high water permeability, permeation of a solute to be excluded is also allowed disadvantageously. When the membrane is formed under the conditions for decreasing the porosity in order to obtain high rejection, the water permeability is impaired. In order to solve this problem, it is necessary to increase the porosity of the entire membrane structure and to appropriately control the distribution (coarse-dense ratio) of the pores.

In response to this problem, the inventors have found that formation of a membrane composed of SPAE using a non-solvent induced phase separation method, and adjustment of the phase separation conditions make it possible to appropriately control the porosity and the pore distribution. The inventors have also found that measurement of the distribution of S atoms in SPAE by Raman spectroscopy makes it possible to measure the pore distribution. Namely, the inventors have found that use of SPAE having excellent chemical durability as a membrane material for the forward osmosis method, control of the porosity of the membrane at high level, and further, appropriate control of the pore distribution make it possible to prevent permeation of the draw solute and ions through the membrane and achieve a high water permeability. In this way, the inventors have arrived at the present invention.

The present invention has been completed based on the above-described findings, and has the features of (1) to (8) described below.

(1) A separation membrane having a structure inclined from an outer surface side to an inner surface side,
a ratio between a thickness of a dense layer having a dense polymer density and a thickness of a coarse layer having a coarse polymer density being in a range of 0.25≤(the thickness of the coarse layer)/[(the thickness of the dense layer)+(the thickness of the coarse layer)]≤0.6, when measuring polymer density distribution in a thickness direction of the separation membrane by Raman spectroscopy.

(2) The separation membrane according to (1), wherein a porosity of the separation membrane is 60 to 85%.

(3) The separation membrane according to (1) or (2), wherein the separation membrane is composed of sulfonated poly(arylene ether) having a repeating structure of a hydrophobic segment represented by the following formula (III) and a hydrophilic segment represented by the following formula (IV):

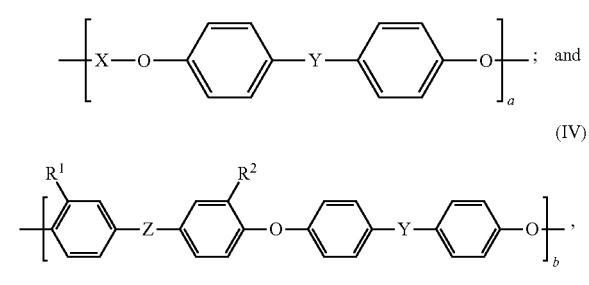
(III)

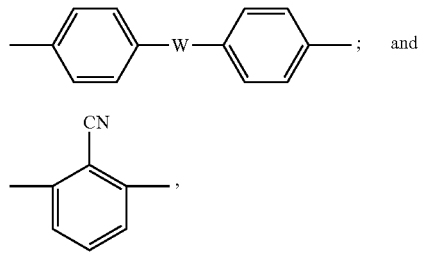
(IV)

where X is any one of the following formulas (V) and (VI):

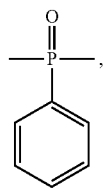
(V)

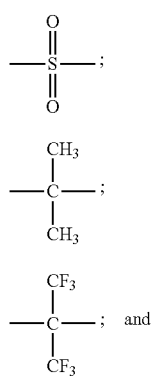
(VI)

Y is any one of single bond and the following formulas (VII) to (X):

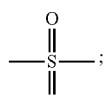
(VII)

(VIII)

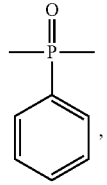
(IX)

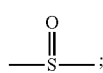
(X)

Z is any one of single bond and the following formulas (VII), (XI) and (X):

(VII)

(XI)

(X)

W is any one of single bond and the following formulas (VII), (XI) and (X):

(VII)

(XI)

(X)

Y and W are not selected to be identical to each other, a and b each represents a natural number equal to or greater than 1, $R^1$ and $R^2$ represent —$SO_3M$, and M represents a metal element, and a ratio of sulfonation expressed as a percentage of the number of repetition of the formula (IV) to a total of the number of repetition of the formula (III) and the number of repetition of the formula (IV) in a sulfonated poly(arylene ether) copolymer is higher than 10% and lower than 50%.

(4) The separation membrane according to (3), wherein the sulfonated poly(arylene ether) copolymer has a repeating structure of a hydrophobic segment represented by the following formula (I) and a hydrophilic segment represented by the following formula (II):

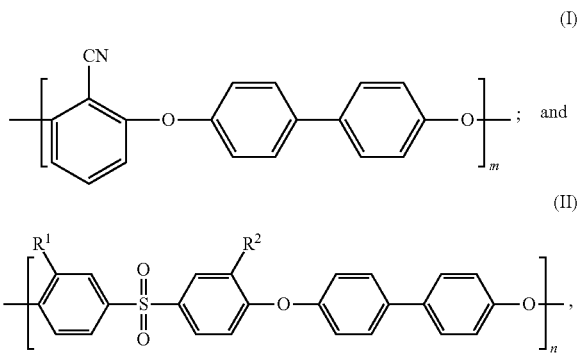

where m and n each represents a natural number equal to or greater than 1, $R^1$ and $R^2$ represent $—SO_3M$, M represents a metal element, and a ratio of sulfonation expressed as a percentage of the number of repetition of the formula (II) to a total of the number of repetition of the formula (I) and the number of repetition of the formula (II) in the sulfonated poly(arylene ether) copolymer is higher than 10% and lower than 50%.

(5) The separation membrane according to any one of (1) to (4), wherein the separation membrane is a forward osmosis membrane.

(6) The separation membrane according to any one of (1) to (5), wherein the separation membrane is a hollow fiber membrane.

(7) A separation membrane element having the separation membrane as recited in any one of (1) to (6) incorporated therein.

(8) A separation membrane module having one or more separation membrane elements as recited in (7) incorporated therein.

Advantageous Effects of Invention

Since SPAE is used as a membrane material, the separation membrane of the present invention has high chemical durability and can be combined with various draw solutions and applied to the forward osmosis method. In addition, since the porosity is kept high and the pore distribution is appropriately controlled, the separation membrane of the present invention can achieve both high rejection and high water permeability as a membrane for the forward osmosis method.

BRIEF DESCRIPTION OF DRAWINGS

FIG. 2 shows an example of analysis result of the measurement result by Raman spectroscopy.

DESCRIPTION OF EMBODIMENTS

Figure 1:
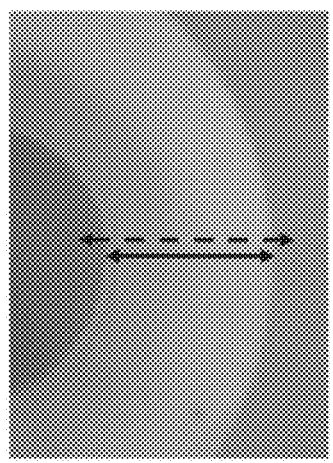
FIG. 1 shows an example of a measurement result by Raman spectroscopy.
Figure 1:
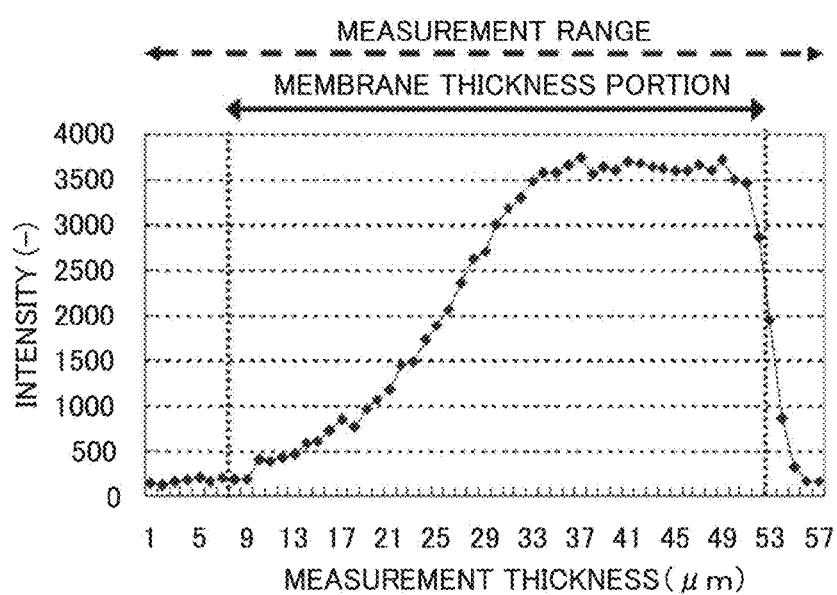

The greatest feature of the separation membrane of the present invention is that SPAE is selected as a material, a membrane having a structure inclined from an outer surface side to an inner surface side, and a ratio between a thickness of a dense layer having a dense polymer density and a thickness of a coarse layer having a coarse polymer density is controlled to be in a range of 0.25≤(the thickness of the coarse layer)/[(the thickness of the dense layer)+(the thickness of the coarse layer)]≤0.6, when measuring the polymer density in a thickness direction of the separation membrane by Raman spectroscopy. Conventionally, there has not existed a separation membrane achieving both high rejection and high water permeability while maintaining chemical durability in such a point of view. When the separation membrane of the present invention is used in the forward osmosis treatment, the draw solution side may be dense and the feed solution side may be coarse, or the draw solution side may be coarse and the feed solution side may be dense. In the case of a hollow fiber-type separation membrane, the inner layer side may be dense and the outer layer side may be coarse, or the inner layer side may be coarse and the outer layer side may be dense. Hereinafter, a hollow fiber-type separation membrane having such a structure that the outer layer side is dense and the inner layer side is coarse will be described by way of example.

The inclined structure of the separation membrane of the present invention is analyzed using a microscopic Raman spectrometer. The microscopic Raman spectrometer is an apparatus configured to detect and spectrally disperse the Raman scattered light generated by irradiation of a sample to be measured with the laser beam, to obtain a Raman spectrum. Since the Raman spectrum is unique to a substance and an intensity of the Raman scattered light is proportional to a concentration of the substance, the distribution state can be analyzed based on a peak intensity ratio unique to the sample. The separation membrane of the present invention composed of SPAE is ice-embedded, to form a cross section using a microtome. With the formed cross section sample being immersed in water, analysis is performed using the laser Raman microscope RAMAN-11 manufactured by Nanophoton Corporation. Using the normally used microscopic Raman spectrometer, the inclined structure of the separation membrane can be measured by mapping or imaging measurement under the normal measurement conditions. In order to measure the distribution state with high precision, it is desirable to use an objective lens such that a spatial resolution is not more than 2 μm. An intensity of a laser beam source during measurement can be arbitrarily set to be low so as not to cause degradation of the sample during measurement, and to be an intensity that the Raman spectrum is obtained in an exposure time of several seconds to several tens of minutes. A peak of the Raman spectrum for analyzing the distribution state is not particularly limited. However, it is desirable to use, as an indicator, a high-intensity peak such as stretching vibration of a benzene ring at about 1600 $cm^{-1}$. The peak intensity ratio can be calculated from a peak area or a peak height of a selected peak.

Figure 3:
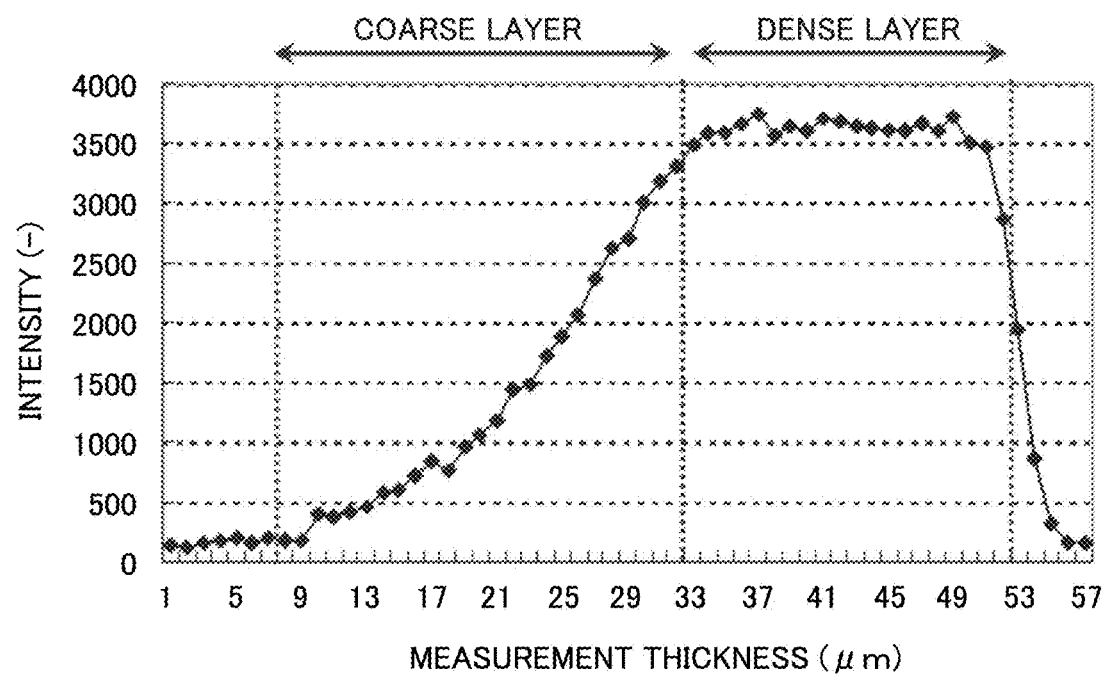
FIG. 3 shows an example of an analysis result of the measurement result by Raman spectroscopy.
Figure 4:
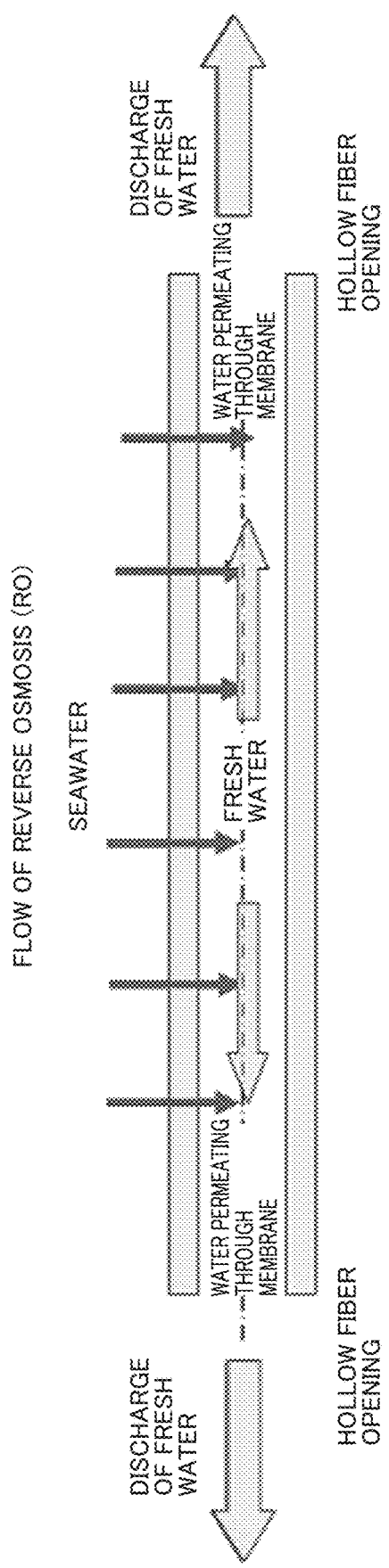
FIG. 4 is an explanatory view showing a flow of the water permeating through a membrane in the case of a hollow fiber-type reverse osmosis membrane.
Figure 5:
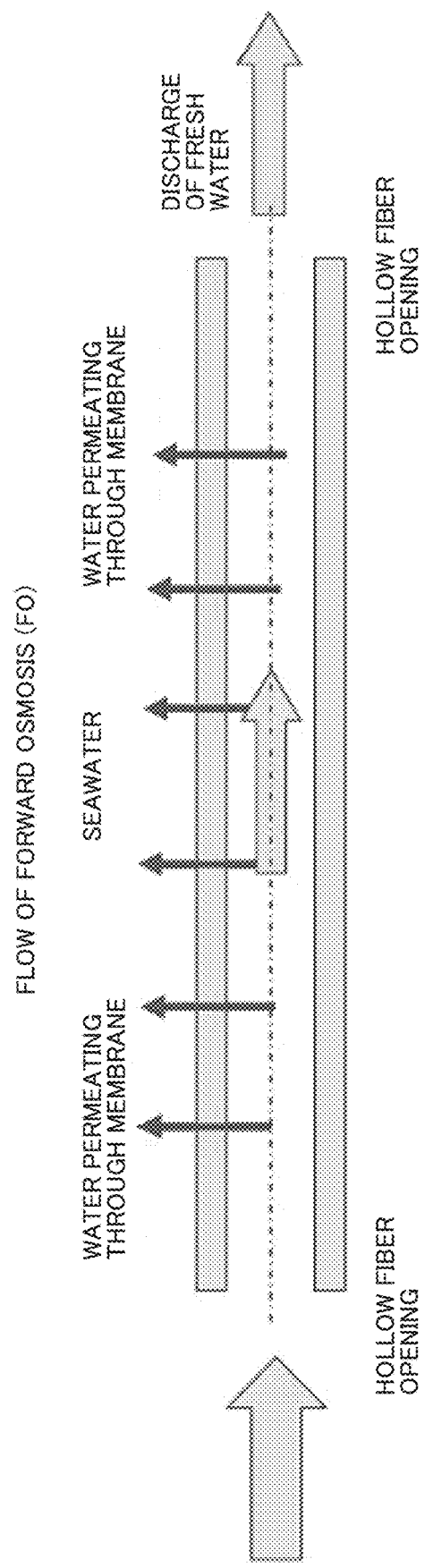
FIG. 5 is an explanatory view showing a flow of the water permeating through a membrane in the case of a hollow fiber-type forward osmosis membrane.
Figure 6:
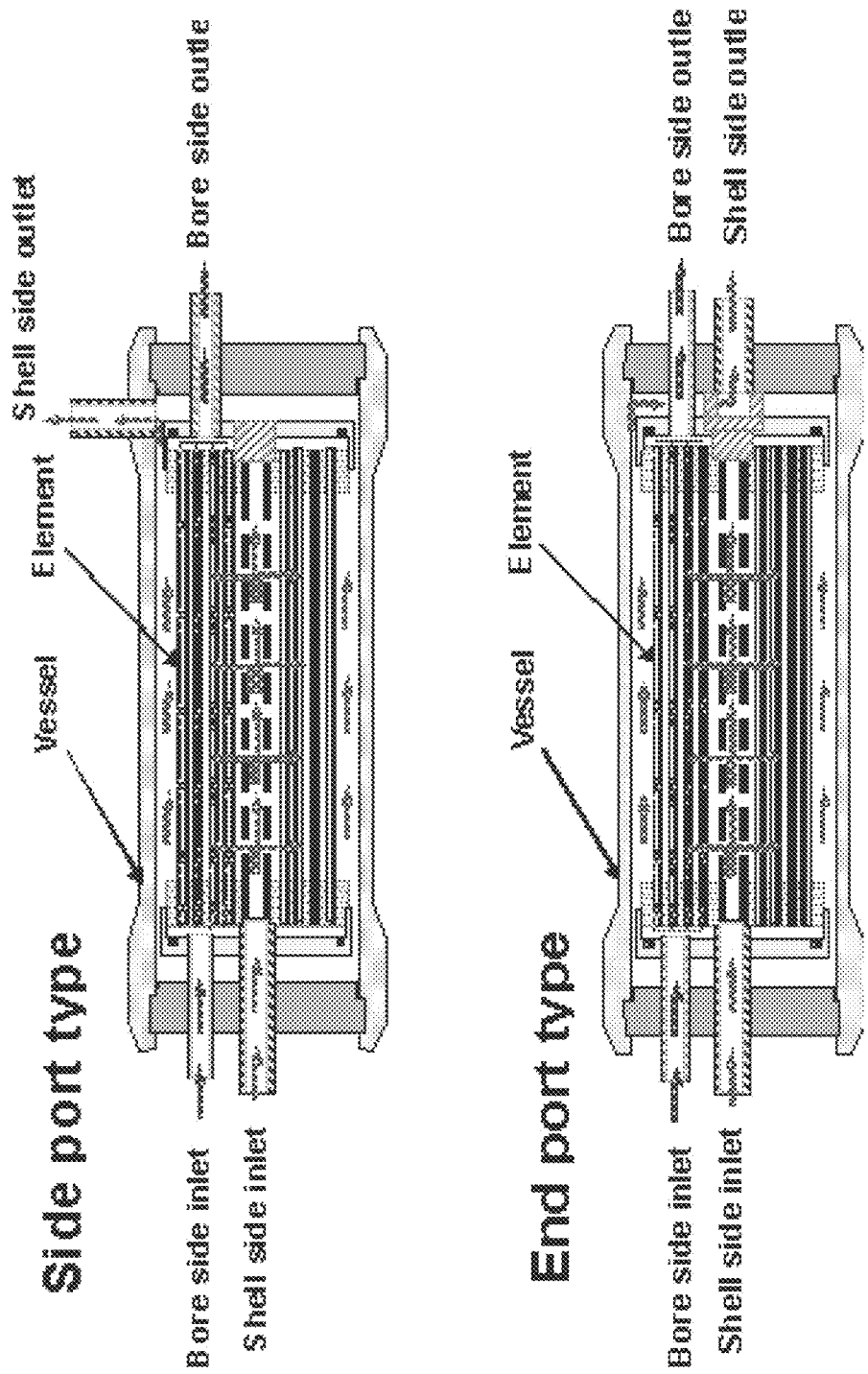
FIG. 6 is a schematic cross-sectional view showing an example of a separation membrane module of the present invention.

FIG. 1 shows an example of an analysis result by Raman spectroscopy. The X axis represents a position in the membrane cross section in a membrane thickness direction, and the Y axis represents a measurement intensity. The obtained peak represents an intensity of the peak derived from SPAE and an intensity ratio thereof represents a density of the SPAE polymer in the separation membrane. In measurement by Raman spectroscopy, the intensity was measured from the membrane inner side toward the membrane outer side at intervals of 1 μm, while observing the membrane sample in FIG. 1 with the microscope. In actual measurement, the intensity was measured in a range indicated by the broken line arrow in FIG. 1, and only the intensity measurement data in a range indicated by the solid line arrow, which was a portion where the membrane existed, was taken out and used as the density distribution data of the membrane. Next, a method for analyzing the obtained data will be described, taking as an example the case of performing measurement on the assumption that the smaller value side of X is the membrane inner side (FIG. 1). Of the data obtained as described above, only the data of the portion where the membrane exists is taken out from FIG. 1, and assuming that the maximum value is S (in the case of FIG. 1, S=3739), the range of 0 to S is divided into ten ranges and the number of points included in each range is counted (FIG. 2). Assuming that the range including the largest number of points is $S1<Y \leq S2$ (in the case of FIG. 2, S1=3365.1 and S2=3739.0), the range including the point where the value of Y exceeds S1 for the first time and the subsequent points is defined as a dense layer and the other range is defined as a coarse layer, when looking at the plot of FIG. 1 in ascending order of the value of X. A value indicating a ratio of a thickness of the coarse layer in the separation membrane composed of SPAE is defined as A=(thickness of coarse layer)/[(thickness of dense layer)+(thickness of coarse layer)] (FIG. 3).

When A is smaller than 0.25, the ratio of the dense layer having a dense polymer density is high. Therefore, the membrane performance is high in a system of applying the pressure to the feed liquid side as in reverse osmosis separation. However, sufficient water permeability is not obtained or water permeation cannot be seen in the case of operation under atmospheric pressure as in forward osmosis separation. On the other hand, when A is greater than 0.6, the ratio of the dense layer having a dense polymer density is low. Therefore, permeation of a substance to be removed and a draw solute is allowed disadvantageously. As a result, an osmotic pressure difference through the membrane becomes small and thus the water permeability also decreases. Namely, an impurity in the feed water and the draw solute permeate through the membrane and the water permeability is also low, and thus, the membrane is not suitable as a forward osmosis separation membrane.

The separation membrane of the present invention is suitably used to remove an inorganic substance and an impurity in the seawater and the discharged water mainly using the forward osmosis method, and the ability of removing sodium chloride when the separation membrane of the present invention is subjected to reverse osmosis evaluation is preferably not less than 30%, and more preferably not less than 50%.

SPAE used as a material of the separation membrane of the present invention is preferably a polymer obtained by copolymerizing a hydrophilic monomer having a sulfonic acid group and a hydrophobic monomer not having a sulfonic acid group. In this SPAE, a chemical structure of each of the hydrophilic monomer having the sulfonic acid group and the hydrophobic monomer can be suitably selected. Specifically, appropriate selection of a highly-rigid chemical structure makes it possible to form the separation membrane that is less likely to swell by water. In addition, adjustment of a quantity of each monomer used in the copolymerization reaction makes it possible to precisely control a quantity of the introduced sulfonic acid group with a high degree of reproducibility. Other methods for obtaining SPAE include a method for sulfonating known poly (arylene ether) with sulfuric acid. However, this method is not preferable because precise control of a ratio of the introduced sulfonic acid group is difficult and a molecular weight is likely to decrease during reaction. As a structure of SPAE obtained by direct copolymerization, a structure including, as a basic skeleton, a polymer having a repeating structure of a hydrophobic segment represented by the following formula (III) in which the benzene rings are linked by ether bond and a hydrophilic segment represented by the following formula (IV) is preferable because this structure exhibits a rigid molecular skelton and excellent chemical durability. Furthermore, this structure is preferable because the entire molecular structure becomes more rigid and excellent chemical durability can be exhibited, particularly when X, Y, Z, and W are selected from a combination of the following in the basic skeleton of the following formulas (III) and (IV):

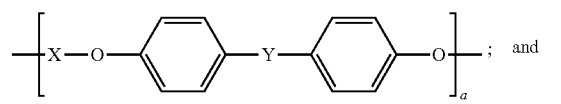

(III)

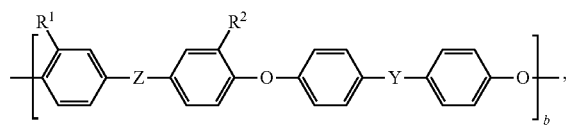

(IV)

where X is any one of the following formulas (V) and (VI):

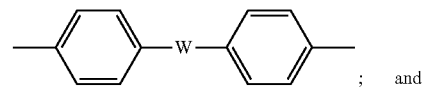

(V)

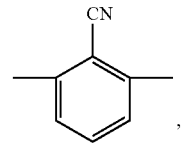

(VI)

Y is any one of single bond and the following formulas (VII) to (X):

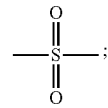

(VII)

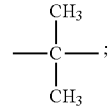

(VIII)

-continued

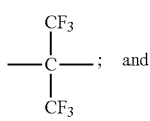  (IX)

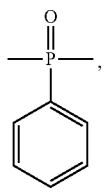  (X)

Z is any one of single bond and the following formulas (VII), (XI) and (X):

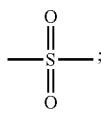  (VII)

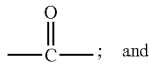  (XI)

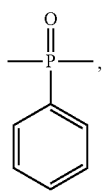  (X)

W is any one of single bond and the following formulas (VII), (XI) and (X):

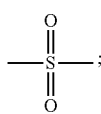  (VII)

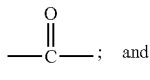  (XI)

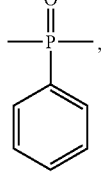  (X)

Y and W are not selected to be identical to each other, a and b each represents a natural number equal to or greater than 1, $R^1$ and $R^2$ represent —$SO_3M$, and M represents a metal element, and a ratio of sulfonation expressed as a percentage of the number of repetition of the formula (IV) to a total of the number of repetition of the formula (III) and the number of repetition of the formula (IV) in a sulfonated poly(arylene ether) copolymer is higher than 10% and lower than 50%.

Although SPAE can be obtained by a conventionally known method, SPAE is obtained, for example, by polymerization by aromatic nucleophilic substitution reaction including a compound represented by the above-described general formula (III) and a compound represented by the above-described general formula (IV) as monomers. In the case of polymerization by the aromatic nucleophilic substitution reaction, an activated difluoro aromatic compound and/or dichloro aromatic compound including a compound represented by the above-described general formula (III) and a compound represented by the above-described general formula (IV) can be reacted with aromatic diols under the presence of a basic compound. Although polymerization can be performed in a temperature range of 0 to 350° C., the temperature ranging from 50 to 250° C. is preferable. When the temperature is lower than 0° C., it is likely that the reaction does not progress sufficiently. When the temperature is higher than 350° C., it is likely that polymer decomposition starts.

Although the reaction can be performed under the absence of a solvent, the reaction is preferably performed in a solvent. Examples of the usable solvent can include N-methyl-2-pyrrolidone, N,N-dimethylacetamide, N,N-dimethylformamide, dimethyl sulfoxide, diphenylsulfone, sulfolane and the like. However, the solvent is not limited thereto. Any solvent may be used as long as it can be used as a solvent that is stable in the aromatic nucleophilic substitution reaction. These organic solvents may be used alone or as a mixture of two or more. Examples of the basic compound include sodium hydroxide, potassium hydroxide, sodium carbonate, potassium carbonate, sodium hydrogen carbonate, potassium hydrogen carbonate and the like. However, the basic compound is not limited thereto and any basic compound can be used as long as it can convert the aromatic dials to an active phenoxide structure. In the aromatic nucleophilic substitution reaction, the water may be generated as a by-product in some cases. In this case, it is also possible to allow toluene and the like to coexist in the reaction system and remove the water to the outside of the system as an azeotrope, regardless of the polymerization solvent. As a method for removing the water to the outside of the system, a water-absorbing material such as a molecular sieve can also be used.

In the case of performing the aromatic nucleophilic substitution reaction in the solvent, the monomers are preferably added such that the monomer concentration of an obtained polymer concentration becomes 5 to 50 mass %. When the obtained polymer concentration is lower than 5 mass %, it is likely that the degree of polymerization does not increase easily. On the other hand, when the obtained polymer concentration is higher than 50 mass %, it is likely that a viscosity of the reaction system becomes too high and thus the post-treatment of the reactant becomes difficult. After the end of the polymerization reaction, the solvent is removed from the reaction solution by evaporation and the residue is washed as needed, to obtain a desired polymer. The polymer can also be obtained by adding the reaction solution to a solvent having a low polymer solubility, precipitating the polymer as a solid and filtering the precipitate.

When SPAE is used in the separation membrane application, an ion exchange capacity IEC (i.e., milliequivalent of a sulfonic acid group per gram of a sulfonated polymer) is preferably 0.6 to 2.4 meq/g, and a ratio of sulfonation DS is preferably higher than 10% and lower than 50%. When IEC and DS are lower than the above-described ranges, the quantity of the sulfonic acid group is too small, and thus, the separability required for a forward osmosis separation membrane is not sufficiently exhibited in some cases. When IEC and DS are higher than the above-described ranges, a hydrophilic property of the polymer becomes high, and thus, SPAE swells excessively and membrane formation becomes difficult.

Further preferably, SPAE used in the separation membrane of the present invention has a repeating structure of a hydrophobic segment represented by the following formula (I) and a hydrophilic segment represented by the following formula (II):

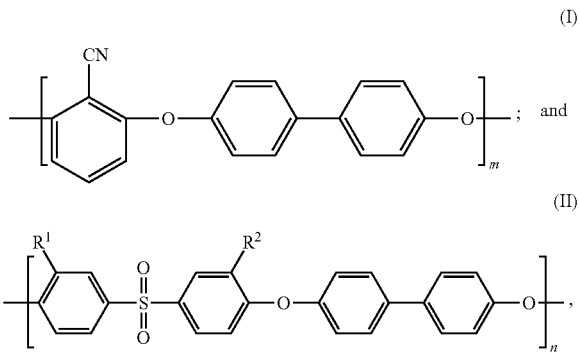

where m and n each represents a natural number equal to or greater than 1, $R^1$ and $R^2$ represent —$SO_3M$, M represents a metal element, and a ratio of sulfonation expressed as a percentage of the number of repetition of the formula (II) to a total of the number of repetition of the formula (I) and the number of repetition of the formula (II) in a sulfonated poly(arylene ether) copolymer is higher than 10% and lower than 50%.

$R^1$ and $R^2$ in the above-described formulas (II) and (IV) represent —$SO_3M$. However, metal element M in the latter case is not particularly limited, and is preferably potassium, sodium, magnesium, aluminum, cesium or the like. Metal element M is more preferably potassium or sodium. In the case of the polymer like SPAE, $R^1$ and $R^2$ can also be —$SO_3H$ instead of —$SO_3M$. However, when —$SO_3H$ is selected, formation of the membrane having the desired inclined structure is difficult and the porosity becomes higher than a desired range, even if the membrane is formed under the below-described preferable membrane formation conditions. Therefore, —$SO_3H$ is not preferable.

From the perspective of forming the separation membrane having a sufficient separation property and a sufficient mechanical strength and suited for the forward osmosis treatment, a number average molecular weight of SPAE represented by the above-described formulas (I) and (II) as well as (III) and (IV) is preferably 1000 to 1000000.

Since SPAE represented by the above-described formulas (I) and (II) as well as (III) and (IV) has a highly-rigid molecular structure, the forward osmosis separation membrane having a high mechanical strength and being less likely to swell by water can be formed. Furthermore, SPAE represented by the above-described formulas (I) and (II) has excellent chemical durability because the hydrophobic segment represented by the above-described formula (I) includes a benzonitrile structure. In addition, the cohesive force of the hydrophobic portion is strong, and thus, the membrane structure in which the hydrophilic domain is supported by the strong hydrophobic matrix is formed, and as a result, swelling by water is further suppressed.

As a result of study, the inventors of the present invention have found that there is a correlation between the phase separation conditions during membrane formation and the value of A described above. Examples of the phase separation conditions during membrane formation include, as described above, the polymer concentration of a membrane-forming solution, the membrane formation temperature (nozzle temperature), the composition of a bore liquid, the coagulation conditions and the like.

Examples of the separation membrane of the present invention include a hollow fiber membrane and a flat sheet membrane. A wet phase separation method on a dry-wet phase separation method is preferably used to obtain the separation membrane of the present invention. The wet phase separation method is a method for immersing a uniform solution-like membrane-forming solution in a coagulation liquid that is composed of a non-solvent wherein a polymer cannot dissolve, but can mix with a good solvent in the membrane-forming solution, and phase-separating and precipitating the polymer, to form a membrane structure. The dry-wet phase separation method is a method for evaporating and drying a solvent from a surface of a membrane-forming solution for a certain time period immediately before immersing the membrane-forming solution in a coagulation liquid, to obtain an asymmetric structure having a higher polymer density of a membrane surface layer. In the present invention, the dry-wet phase separation method is more preferable from the perspective of easily obtaining the membrane having the desired pore distribution.

A method for manufacturing the separation membrane of the present invention will be described, taking the case of the hollow fiber membrane as an example. The hollow fiber membrane can be manufactured by discharging a membrane-forming solution from an outer circumferential slit of a double-cylindrical spinning nozzle to have a hollow cylindrical shape, extruding a fluid selected from a non-solvent, a solvent or a mixed solvent thereof, a liquid that is incompatible with a solvent in a membrane-forming solution, and a gas such as nitrogen and air from an inner hole of the spinning nozzle together with the membrane-forming solution as a bore liquid for forming a hollow portion, and providing a certain length of drying (solvent evaporating) time if desired, and then, immersing the membrane-forming solution in a coagulating bath. The as-needed heat treatment in the solution provides the obtained separation membrane with the fixation of the membrane structure, the thermal stability of the dimensional stability.

The concentration of SPAE in the membrane-forming solution is preferably 25 mass % to 45 mass %. When the concentration of SPAE in the membrane-forming solution is higher than this range, A becomes smaller than 0.25 even if the other phase separation conditions are variously studied, and thus, the water permeability becomes low or water permeation cannot be seen in some cases. When the polymer density is lower than this range, A becomes greater than 0.6 even if the other phase separation conditions are variously studied, and thus, the ratio of the dense layer becomes low and the separability required for a forward osmosis membrane is not exhibited in some cases. Even if membrane formation is performed in the above-described range of the polymer concentration, pore distribution A may deviate from the range of not smaller than 0.25 and not greater than 0.6 when the other membrane formation conditions deviate from the preferable ranges as described below.

Examples of the solvent of SPAE of the present invention include N-methyl-2-pyrrolidone (NMP), N,N-dimethylacetamide, dimethyl sulfoxide, N,N-dimethylformamide, and γ-butyrolactone. The non-solvent is not particularly limited, and water, alcohol and polyalcohol (such as ethylene glycol, diethylene glycol, triethylene glycol, and glycerin) are preferable. The boiling point of the non-solvent should be selected to be higher than the membrane formation temperature or the temperature of the coagulating bath.

The weight ratio between the solvent and the non-solvent in the membrane-forming solution is preferably in the range of 100/0 to 70/30, and more preferably in the range of 100/0 to 80/20. When the weight ratio of the non-solvent is higher than the above-described range, the non-solvent is incompatible with SPAE in the above-described range of the polymer concentration in the membrane-forming solution, and thus, the membrane cannot be formed in some cases.

The membrane formation (nozzle) temperature is preferably not lower than 155° C. The upper limit of the temperature is not higher than the boiling point of the membrane formation solvent, and preferably not higher than 180° C. The membrane formation step using the dry-wet phase separation method has the step of drying the solvent for a certain time period after discharging the membrane-forming solution. In this drying step, the membrane-forming solution forms a concentration gradient between the outer layer side and the inner layer side. Specifically, the polymer concentration becomes higher on the outer layer side due to drying of the solvent, whereas the polymer concentration on the inner layer side is kept low. The formed concentration gradient greatly affects the inclined structure of the formed separation membrane, and thus, appropriate control of the concentration gradient formation in the drying step is extremely important. When the membrane formation temperature is lower than 155° C., drying of the solvent on the outer layer side becomes extremely slow, and thus, the inclined structure appropriate for the separation membrane suitable for the forward osmosis treatment cannot be obtained.

As the bore liquid for forming the hollow portion, a mixed solution of a solvent and a non-solvent, or a non-solvent is preferably used. As described above, the concentration gradient formation of the membrane-forming solution in the drying (evaporating) step of the dry-wet phase separation method greatly affects the inclined structure of the separation membrane. The bore liquid greatly affects the concentration gradient formation on the inner layer side. Therefore, the solvent of SPAE, which is a component for suppressing solidification and drying of the polymer solution, is mixed in the bore liquid at a certain ratio, which makes it possible to achieve the inclined structure appropriate for the separation membrane suitable for the forward osmosis treatment while keeping the polymer concentration on the inner layer side lower. According to the study conducted by the inventors of the present invention, when the ratio of the solvent in the bore liquid exceeds 80%, coagulation of the membrane-forming solution does not progress sufficiently or requires extremely long time, and thus, the separation membrane frequently breaks during the membrane formation step. Therefore, the ratio of the solvent in the bore liquid exceeding 80% is not preferable from the perspective of production management as well. The composition of the used bore liquid is preferably solvent/non-solvent=0 to 70/100 to 30, and more preferably 0 to 50/100 to 50.

In the dry-wet phase separation method, the certain length of solvent drying time is provided before the step of immersing the membrane-forming solution in the coagulating bath. The drying time and the drying temperature are not particularly limited, and should be adjusted such that the finally obtained separation membrane has a desired structure. For example, the solvent is preferably partially dried for 0.01 to 0.5 seconds at an ambient temperature of 5 to 200° C.

In the above-described solvent drying (evaporating) step, the structure inclined from the membrane outer layer side to the membrane inner layer side is formed. The obtained inclined structure is affected by two factors, i.e., the membrane formation (nozzle) temperature that affects the structure formation from the membrane outer layer side and the composition of the bore liquid that affects the structure formation from the membrane inner layer side. When the membrane formation temperature is sufficiently high, e.g., not lower than 170° C., the concentration gradient is likely to be formed in the drying step due to the high membrane formation temperature. Therefore, even when the composition of only the non-solvent is used without mixing the solvent of SPAE in the bore liquid, the desired inclined structure can be obtained. On the other hand, when the membrane formation temperature is lower than 155° C., the concentration gradient is not formed sufficiently due to the low membrane formation temperature. Therefore, even when the solvent is mixed in the bore liquid at a certain ratio, the desired inclined structure cannot be obtained.

The non-solvent of the coagulating bath used in the wet phase separation method or the dry-wet phase separation method is not particularly limited. In accordance with the known phase separation method, water, alcohol and polyalcohol (such as ethylene glycol, diethylene glycol, triethylene glycol, and glycerin) are preferable, and a mixed liquid thereof may be used. From the perspective of the economic efficiency and the ease of production management, water is preferably included as a component.

Similarly, in accordance with the known phase separation method, another substance may be added to the above-described non-solvent of the coagulating bath. For example, from the perspective of adjusting the solvent exchange speed in the coagulation process to make the membrane structure preferable, N-methyl-2-pyrrolidone, N,N-dimethylacetamide, dimethyl sulfoxide, N,N-dimethylformamide, or γ-butyrolactone, which is the solvent of SPAE, can be added to the coagulating bath. In addition, polysaccharides or a water-soluble polymer may be added in order to adjust a viscosity of the coagulating bath. In the case of using the coagulating bath having the composition containing the water and the solvent of SPAE, the ratio of the solvent is increased to decrease the separability and increase the water permeability. Namely, control of the ratio of the solvent allows fine adjustment to the desired membrane performance. However, when the ratio of the solvent exceeds 50%, the coagulation speed of the membrane-forming solution becomes extremely slow and thus the membrane formation step becomes unstable, such as flattening of the shape of the hollow fiber membrane. Therefore, the ratio of the solvent exceeding 50% is not desirable.

The temperature of the coagulating bath is not particularly limited, and an appropriate temperature may be selected from the perspective of achieving the desired porosity and the desired pore distribution or from the perspective of the economic efficiency and the work safety. Specifically, the temperature of the coagulating bath is preferably not lower than 0° C. and lower than 100° C., and more preferably not lower than 10° C. and not higher than 50° C. According to the study conducted by the inventors of the present invention, for each combination of the polymer concentration of the membrane-forming solution, the solvent, the non-solvent, and the composition of the bore liquid, there is an optimum point of the temperature of the coagulating bath, i.e., a point where the separability and the water permeability of the separation membrane suitable for the forward osmosis treatment are well-balanced. Therefore, search and selection of the appropriate temperature condition are required.

The time of immersion in the coagulating bath may be adjusted to the time during which the structure of the separation membrane is sufficiently formed. From the perspective of allowing the coagulation to progress sufficiently and preventing the time of the step from becoming longer wastefully, the time of immersion in the coagulating bath is preferably in the range of 0.1 to 1000 seconds, and more preferably in the range of 1 to 600 seconds.

The separation membrane obtained after the completion of the membrane structure formation in the coagulating bath is preferably washed with water. A method for water washing is not particularly limited. The separation membrane may be immersed in water for a sufficient time period, or may be washed with running water for a certain time period while carrying the separation membrane.

The membrane subjected to the water washing treatment is preferably immersed in water in a non-stress state and subjected to heat treatment at 50 to 100° C. for 5 to 60 minutes. The heat treatment makes it possible to fix the membrane structure, enhance the dimensional stability and enhance the thermal stability. On the other hand, when the treatment is performed to greatly change the inclined structure obtained in the membrane formation step, the separation membrane deviates from the range that is preferable as the separation membrane suitable for the forward osmosis treatment. Namely, the heat treatment step using an aqueous solution of inorganic salts, which is performed, for example, in a separation membrane like a reverse osmosis separation membrane that requires high physical durability, significantly changes the inclined structure obtained by membrane formation, and as a result, the separation membrane deviates from the preferable range. According to the study conducted by the inventors of the present invention, the heat treatment in pure water makes it possible to provide a certain level of thermal stability while keeping the appropriate inclined structure.

The porosity of the separation membrane of the present invention obtained as described above is preferably 60 to 85%. When the porosity is lower than the above-described range, the forward osmosis performance is less likely to be exhibited although the reverse osmosis performance is exhibited. When the porosity exceeds the above-described range, it becomes difficult to keep a salt rejection low.

The separation membrane of the present invention is characterized in that the forward osmosis performance is higher than the reverse osmosis performance because the membrane material and the membrane structure are optimized for the forward osmosis treatment application. Specifically, the water permeability exhibited under the forward osmosis treatment conditions is preferably not less than 3 L/m²/h, and more preferably not less than 3.5 L/m²/h.

The separation membrane of the present invention obtained as described above is incorporated into a separation membrane module as a separation membrane element. As disclosed in, for example, Japanese Patent Gazette Nos. 4412486, 4277147, 3591618, and 3008886, in the case of the hollow fiber-type separation membrane, for example, 45 to 90 hollow fiber separation membranes are gathered as a single hollow fiber membrane aggregate. A plurality of hollow fiber membrane aggregates is aligned laterally as a flat hollow fiber membrane bundle. The hollow fiber membrane bundle is traversely wound around a core pipe having a large number of pores, to form crossed portions of the hollow fiber membrane (bundle) at specific circumferential positions of a wound body. Both ends of the wound body are bonded and only one side or both sides of the wound body are then cut to form hollow fiber membrane openings. There is thus obtained a separation membrane element. One or more hollow fiber-type separation membrane elements thus obtained are charged into a pressure vessel to assemble a separation membrane module.

The separation membrane module of the present invention is suitable for the water treatment of bringing liquids of different concentrations (osmotic pressures) into contact with each other through a separation membrane and using a concentration difference between the liquids as drive force to allow the fresh water to permeate from the aqueous solution having a lower concentration to the aqueous solution having a higher concentration. The preferable highly-concentrated aqueous solution is the seawater existing in abundance in the natural world, the concentrated seawater, or an artificially obtained highly-concentrated aqueous solution, and an osmotic pressure thereof is 0.5 to 10 MPa depending on a molecular weight of a solute. The fresh water having permeated to the highly-concentrated aqueous solution side can be recovered using another method, to recover the fresh water from the feed water, and the fresh water can be removed from the feed water. In the case of taking out the fresh water from the seawater, the seawater can be used as the feed water and an aqueous solution having a higher concentration and a higher osmotic pressure than those of the seawater can be used as the highly-concentrated aqueous solution. In the case a taking out the fresh water from an aqueous solution having a lower concentration and a lower osmotic pressure than those of the seawater, and dehydrating and concentrating the fresh water, the seawater existing in abundance in the natural world can be used as the highly-concentrated aqueous solution. Since the separation membrane of the present invention is designed such that the water permeability is high and the quantity of water permeation is high due to high selectivity of the water and the salt when the salt concentration difference is used as drive force, the separation membrane of the present invention can be suitably used in the forward osmosis treatment.

EXAMPLES

Hereinafter, the present invention will be further specifically described with reference to Examples. However, the present invention is not limited to these Examples. Characteristic values in Examples were measured in accordance with the following method.

<Evaluation of SPAE Polymer>

The degree of sulfonation and the ion exchange capacity (IEC) of the SPAE polymer were evaluated as described below.

(Degree of Sulfonation)

The weight of the SPAE polymer dried overnight under nitrogen atmosphere was measured, and the SPAE polymer was stirred with a sodium hydroxide aqueous solution and then subjected to back titration with a hydrochloric acid aqueous solution, to evaluate the ion exchange capacity (IEC).

(IEC)

10 mg of the polymer dried overnight at 120° C. with a vacuum drier was dissolved in 1 mL of deuterated DMSO (DMSO-d6) and subjected to proton NMR measurement using BRUKER AVANCE500 (frequency: 500.13 MHz, measurement temperature: 30° C., the number of FT accumulations: 32). A relationship between peak positions and protons included in a hydrophobic segment and a hydrophilic segment was identified in the obtained spectral chart, and IEC was obtained based on an integrated intensity ratio per one proton between an independent peak of the protons in the hydrophobic segment and an independent peak of the protons in the hydrophilic segment.

<Method for Evaluating Separation Membrane>

Evaluation of the membrane shape, evaluation of the reverse osmosis performance, evaluation of the forward osmosis performance, measurement of the porosity, and measurement of the polymer density distribution in the membrane were performed on the separation membrane using the following methods.

(Shape of Separation Membrane)

The shape of the separation membrane sample was evaluated using the following method. An appropriate quantity of hollow fiber bundle was put into a hole of 3 mm$\phi$ bored in an SUS plate having a thickness of 2 mm, and the hollow fiber bundle was cut with a razor blade to expose a cross section. Thereafter, a photograph of the shape of the cross section was taken using a microscope (ECLIPSE LV100) manufactured by Nikon Corporation as well as an image processing apparatus (DIGITAL SIGHT DS-U2) and a CCD camera (DS-Ri1) manufactured by Nikon Corporation, and an outer diameter and an inner diameter of the hollow fiber membrane cross section were measured using the measuring function of the image analysis software (NIS Element D3.00 SP6), to calculate the outer and inner diameters and a thickness of the hollow fiber membrane.

(Measurement of Quantity of Reverse Osmosis Water Permeation of Separation Membrane)

The hollow fiber membranes each having a length of 1 m were bundled into a loop and one side thereof was inserted into a plastic sleeve. Thereafter, a thermosetting resin was injected into the sleeve and cured for sealing. The ends of the hollow fiber membranes cured with the thermosetting resin were cut to obtain an open surface of the hollow fiber membranes, and an evaluation module was thus fabricated. This evaluation module was connected to a hollow fiber membrane performance tester including a feed water tank and a pump, to evaluate the performance. The hollow fiber membrane performance tester was operated for about 30 minutes to 1 hour under the evaluation conditions that the sodium chloride concentration of the feed water solution was 1500 mg/L, the temperature was 25° C. and the pressure was 0.5 MPa, and then, the water having permeated through the membranes was collected and a weight of the permeated water was measured using an electronic balance (LIBROR EB-3200D manufactured by Shimadzu Corporation). The weight of the permeated water was converted to a quantity of the permeated water at 25° C. in accordance with the following equation:

Quantity of permeated water (L)=weight of permeated water (kg)/0.99704 (kg/L).

The quantity of water permeation (FR) was calculated in accordance with the following equation:

FR[L/m$^2$/day]=quantity of permeated water [L]/membrane area [m$^2$]/collection time [min]×(60 [min]×24 [hr]).

(Measurement of Salt Rejection of Separation Membrane)

Using an electric conductivity meter (CM-25R manufactured by DKK-TOA Corporation), measurement was performed of the sodium chloride concentrations of the membrane-permeated water collected in the above-described measurement of the quantity of water permeation and the feed water solution having a sodium chloride concentration of 1500 mg/L which was also used in the measurement of the quantity of water permeation.

The salt rejection was calculated in accordance with the following equation:

Salt rejection [%]=(1−salt concentration of membrane-permeated water [mg/L]/salt concentration of feed water solution [mg/L])×100.

(Measurement of Quantity of Forward Osmosis Water Permeation of Separation Membrane)

100 hollow fiber membranes each having a length of 1 m were bundled into a loop and both sides thereof were inserted into a plastic sleeve. Thereafter, a thermosetting resin was injected into the sleeve and cured for sealing. The ends of the separation membranes cured with the thermosetting resin were cut to obtain open surfaces at both ends of the separation membranes, and an evaluation module was thus fabricated. This evaluation module was connected to a performance tester including a feed water tank, a draw solution tank and pumps, to evaluate the performance. As the evaluation conditions, pure water was used as the feed water and a 70 g/L sodium sulfate aqueous solution was used as the draw solution. The pure water was supplied to the outside of the separation membranes using the supply pump, to allow the pure water to pass outside the separation membranes. Thereafter, the pure water was supplied to one open surface of the separation membranes using the supply pump and was flown out from the other open surface. A flow rate outside the separation membranes was adjusted using a flow rate adjusting valve, and a pressure and a flow rate inside the separation membranes were adjusted using a flow rate adjusting valve. Assuming that PDS1 (MPa) represents a supply pressure of the draw solution, QDS1 (L/min) represents a supply flow rate of the draw solution, QDS2 (L/min) represents a quantity of discharged draw solution, QFS1 (L/min) represents a supply flow rate of the pure water, QFS2 (L/min) represents an outflow rate of the pure water, and PFS2 (kPa) represents an outflow pressure of the pure water, the flow rate and the pressure of each supply pump were adjusted such that the quantity of water permeation (QDS2−QDS1) of the module, the pressure and the flow rate satisfied the following conditions, and an increment (QDS2−QDS1) of the flow rate of the draw solution under the following conditions was measured as a quantity of water permeation of the module.

PDS1=not higher than 1.0 MPa
PFS2=not higher than 10 kPa
QDS1=1.5 mL/min
QFS1=1.0 L/min The quantity of water permeation (FR) depending on concentration was calculated in accordance with the following equation:

FR [L/m$^2$/hr]=quantity of water permeation of module [L/min]/outer diameter-based membrane area [m$^2$]×(60 [min]).

(Measurement of Porosity)

The separation membrane immersed in pure water for 1 hour or more was centrifugally deliquored for 5 minutes at a rotation speed of 900 rpm, and a weight was measured. Thereafter, the separation membrane was completely dried in the dryer, and a weight was measured (Mp).

Wt (weight of water filled with pores)=weight of separation membrane subjected to centrifugation−Mp porosity (%)=Wt/(Wt+Mp/polymer density)×100

(Measurement of Pore Distribution)

One separation membrane of the present invention composed of SPAE was ice-embedded to form a cross section with a microtome. With the formed cross section sample being immersed in water, mapping analysis was performed using the laser Raman microscope RAMAN-11 manufactured by Nanophoton Corporation under the conditions that the laser wavelength was 532 nm, the laser intensity was about 9 mW, the aperture was 50 μmϕ, the exposure time was 4 seconds, the number of exposure was 1, the magnification of the objective lens was 100×, the numerical aperture of the objective lens was 0.6, and the mapping interval was 1.0 μm. A peak at 1610 cm$^{-1}$ was selected as the peak for analyzing the distribution state. The signal intensity of the peak was calculated using the peak area calculation software attached to the microscopic Raman spectrometer, taking 1400 to 1800 cm$^{-1}$ as a baseline.

(Analysis of Pore Distribution)

FIG. 1 shows an example of an analysis result by Raman spectroscopy. The X axis represents a position in the membrane cross section in a membrane thickness direction, and the Y axis represents a measurement intensity. The obtained peak represents an intensity of the peak derived from SPAE and an intensity ratio thereof represents a density of SPAE. In measurement by Raman spectroscopy, the intensity was measured from the inner layer side toward the outer layer side at intervals of 1 μm, while observing the membrane sample in FIG. 1 with the microscope. In actual measurement, the intensity was measured in a portion indicated by the broken line arrow in FIG. 1, and only the intensity measurement data in a portion indicated by the solid line arrow, which was a portion where the membrane existed, was taken out and used as the density distribution data of the membrane. Next, a method for analyzing the obtained data will be described, taking as an example the case of performing measurement on the assumption that the smaller value side of X is the membrane inner layer side (FIG. 1). Of the data obtained as described above, only the data of the portion where the membrane exists was taken out from FIG. 1. Next, assuming that the maximum value of the plotted data was S (in the case of FIG. 2, S=3739), the range of 0 to S was divided into ten ranges and the number of points included in each range was counted (FIG. 3). Assuming that the range including the largest number of points was S1<Y≤S2 (in the case of FIG. 2, S1=3365.2 and S2=3739.0), the range including the point where the value of Y exceeded S1 for the first time and the subsequent points was defined as a dense layer and the other range was defined as a coarse layer, when looking at the plot of FIG. 2 in ascending order of the value of X. A value indicating a ratio of a thickness of the coarse layer in the separation membrane composed of SPAE was defined as A=(thickness of coarse layer)/[(thickness of dense layer)+(thickness of coarse layer)].

Example 1

(Polymerization of SPAE)

20.00 g of 3,3'-disulfo-4,4'-dichlorodiphenylsulfone disodium salt (hereinafter abbreviated as S-DCDPS), 19.38 g of 2,6-dichlorobenzonitrile (hereinafter abbreviated as DCBN), 28.54 g of 4,4'-biphenol (hereinafter abbreviated as BP), and 24.35 g of potassium carbonate were weighed and put into a 1000 mL four-necked flask having a cooling reflux tube attached thereto, and nitrogen was flown at 0.5 L/min. 220 mL of N-methyl-2-pyrrolidone (hereinafter abbreviated as NMP) was introduced and the flask was put into an oil bath. The temperature of the oil bath was set at 150° C. and stirring was performed for 30 minutes. Thereafter, the temperature of the oil bath was raised to 210° C. and the reaction proceeded for 12 hours. After cooling, the polymerization reaction solution was precipitated in water in the form of strand. The obtained polymer was washed six times with water of ordinary temperature, and vacuum-dried at 110° C. The degree of sulfonation (hereinafter abbreviated as DS) was measured, and as a result, SPAE of DS=26.5% was obtained.

(Formation of Separation Membrane)

N-methyl-2-pyrrolidone (hereinafter abbreviated as NMP) was added to and kneaded with the fabricated SPAE such that the fabricated SPAE had a concentration of 40 mass %, and the fabricated SPAE was dissolved at 150° C., to obtain a uniform membrane-forming solution.

Then, while keeping the temperature of the membrane-forming solution at 170° C., the membrane-forming solution was extruded from a double cylindrical tube nozzle to have a hollow shape, and a solution in which 30 mass % of N-methyl-2-pyrrolidone (NMP) and 70 mass % of ethylene glycol were mixed was simultaneously extruded as a bore liquid. The membrane-forming solution and the bore liquid was run by 15 mm in the air and subjected to drying treatment. Thereafter, the resultant product was immersed in a coagulating bath of 30° C. filled with water and wound at 15 m/min using a roller, to fabricate a separation membrane. Thereafter, the separation membrane was subjected to water washing treatment. The separation membrane subjected to the above-described water washing treatment was subjected to heat treatment for 20 minutes in water of 70° C.

The outer diameter of the obtained separation membrane in a wet state was 185 μm and the inner diameter thereof was 90 μm. The reverse osmosis performance of the obtained separation membrane was evaluated. As a result, the quantity of water permeation was 70 L/m$^2$/day and the salt rejection was 71.8% under the conditions that the test pressure was 0.5 MPa and the concentration of sodium chloride was 1500 mg/L.

The forward osmosis performance of the obtained separation membrane was evaluated. As a result, the quantity of water permeation was 5.8 L/m$^2$/h under the conditions that pure water was used as the feed liquid and a 7.0 mass % sodium sulfate aqueous solution was used as the draw solution.

The porosity and the pore distribution of the obtained separation membrane were measured. As a result, the porosity was 73.0% and the pore distribution was A=0.51.

Example 2

(Polymerization of SPAE)

Using the same method as that of Example 1, SPAE of DS=26.5% was obtained.

(Formation of Separation Membrane)

Using the same method as that of Example 1, a separation membrane was obtained except that a solution in which 50 mass % of N-methyl-2-pyrrolidone and 50 mass % of ethylene glycol were mixed was used as the bore liquid. The obtained separation membrane was subjected to water washing treatment and heat treatment.

The outer diameter of the obtained separation membrane was 184 μm and the inner diameter thereof was 90 μm. The reverse osmosis performance of the obtained separation membrane was evaluated. As a result, the quantity of water permeation was 82 L/m$^2$/day and the salt rejection was 63.8%.

The forward osmosis performance of the obtained separation membrane was evaluated. As a result, the quantity of water permeation was 6.8 L/m$^2$/h.

The porosity of the obtained separation membrane was 76.2% and the pore distribution thereof was A=0.52.

Example 3

(Polymerization to SPAE)

Using the same method as that of Example 1, SPAE of DS=26.5% was obtained.

(Formation of Separation Membrane)

Using the same method as that of Example 1, a separation membrane was obtained except that the temperature of the membrane-forming solution was 160° C. The obtained separation membrane was subjected to water washing treatment and heat treatment.

The outer diameter of the obtained separation membrane was 185 μm and the inner diameter thereof was 89 μm. The reverse osmosis performance of the obtained separation membrane was evaluated. As a result, the quantity of water permeation was 104 L/m$^2$/day and the salt rejection was 55.2%.

The forward osmosis performance of the obtained separation membrane was evaluated. As a result, the quantity of water permeation was 7.2 L/m$^2$/h.

The porosity of the obtained separation membrane was 80.1% and the pore distribution thereof was A=0.57.

Example 4

(Polymerization of SPAE)

Using the same method as that of Example 1, SPAE of DS=26.5% was obtained.

(Formation of Separation Membrane)

Using the same method as that of Example 1, a separation membrane was obtained except that the temperature of the membrane-forming solution was 180° C. The obtained separation membrane was subjected to water washing treatment and heat treatment.

The outer diameter of the obtained separation membrane was 185 μm and the inner diameter thereof was 90 μm. The reverse osmosis performance of the obtained separation membrane was evaluated. As a result, the quantity of water permeation was 46 L/m$^2$/day and the salt rejection was 83.0%.

The forward osmosis performance of the obtained separation membrane was evaluated. As a result, the quantity of water permeation was 4.1 L/m$^2$/h.

The porosity of the obtained separation membrane was 66.8% and the pore distribution thereof was A=0.45.

Example 5

(Polymerization of SPAE)

Using the same method as that of Example 1, SPAE of DS=26.5% was obtained.

(Formation of Separation Membrane)

Using the same method as that of Example 1, a separation membrane was obtained except that the heat treatment temperature was 60° C. The obtained separation membrane was subjected to water washing treatment and heat treatment.

The outer diameter of the obtained separation membrane was 188 μm and the inner diameter thereof was 91 μm. The reverse osmosis performance of the obtained separation membrane as evaluated. As a result, the quantity of water permeation was 81 L/m$^2$/day and the salt rejection was 65.6%.

The forward osmosis performance of the obtained separation membrane was evaluated. As a result, the quantity of water permeation was 6.6 L/m$^2$/h.

The porosity of the obtained separation membrane was 78.2% and the pore distribution thereof was A=0.52.

Example 6

(Polymerization of SPAE)

Using the same method as that of Example 1, SPAE of DS=26.5% was obtained.

(Formation of Separation Membrane)

Using the same method as that of Example 1, a separation membrane was obtained except that the heat treatment temperature was 98° C. The obtained separation membrane was subjected to water washing treatment and heat treatment.

The outer diameter of the obtained separation membrane was 185 μm and the inner diameter thereof was 90 μm. The reverse osmosis performance of the obtained separation membrane was evaluated. As a result, the quantity of water permeation was 46 L/m$^2$/day and the salt rejection was 79.4%.

The forward osmosis performance of the obtained separation membrane was evaluated. As a result, the quantity of water permeation was 3.9 L/m$^2$/h.

The porosity of the obtained separation membrane was 65.0% and the pore distribution thereof was A=0.47.

Example 7

(Polymerization of SPAE)

SPAE having a repeating structure of a hydrophobic segment represented by the following formula (XII) and a hydrophilic segment represented by the following formula (XIII), which were selected from the group consisting of the above-described formulas (III) and (IV), was prepared as described below.

16.00 g of S-DCDPS, 26.23 g of 4,4'-dichlorodiphenyl sulfone, 22.70 g of BP, and 18.52 g of potassium carbonate were weighed and put into a 1000 mL four-necked flask having a cooling reflux tube attached thereto, and nitrogen was flown at 0.5 L/min. 221 mL of NMP was introduced and the flask was put into an oil bath. The temperature of the oil bath was set at 150° C. and stirring was performed for 30 minutes. Thereafter, the temperature of the oil bath was raised to 210° C. and the reaction proceeded for 12 hours. After cooling, the polymerization reaction solution was precipitated in water in the form of strand. The obtained polymer was washed six times with water of ordinary temperature, and vacuum-dried at 110° C. DS was measured, and as a result, SPAE of DS=26.5% was obtained.

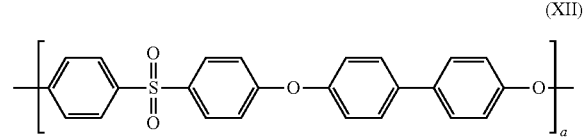

(XII)

-continued (XIII)

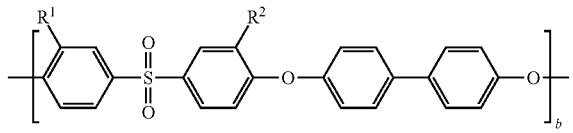

In the above-described formulas, a and b as well as $R^1$ and $R^2$ have the same meaning as that defined in the above-described formulas (III) and (IV).

(Formation of Separation Membrane)

Using the same method as that of Example 1, a separation membrane was obtained. The obtained separation membrane was subjected to water washing treatment and heat treatment.

The outer diameter of the obtained separation membrane was 186 μm and the inner diameter thereof was 90 μm. The reverse osmosis performance of the obtained separation membrane was evaluated. As a result, the quantity of water permeation was 70 L/m²/day and the salt rejection was 70.2%.

The forward osmosis performance of the obtained separation membrane was evaluated. As a result, the quantity of water permeation was 5.7 L/m²/h.

The porosity of the obtained separation membrane was 72.9% and the pore distribution thereof was A=0.50.

Example 8

(Polymerization of SPAE)

16.00 g of S-DCDPS, 37.82 g of DCBN, 30.07 g of BP, and 24.53 g of potassium carbonate were weighed and put into a 1000 mL four-necked flask having a cooling reflux tube attached thereto, and nitrogen was flown at 0.5 L/min. 277 mL of NMP was introduced and the flask was put into an oil bath. The temperature of the oil bath was set at 150° C. and stirring was performed for 30 minutes. Thereafter, the temperature of the oil bath was raised to 210° C. and the reaction proceeded for 12 hours. After cooling, the polymerization reaction solution was precipitated in water in the form of strand. The obtained polymer was washed six times with water of ordinary temperature, and vacuum-dried at 110° C. As a result of measurement, SPAE of DS=20.0% was obtained.

(Formation of Separation Membrane)

NMP was added to and kneaded with the formed SPAE such that the formed SPAE had a concentration of 35 mass %, and the formed SPAE was dissolved at 150° C., to obtain a uniform membrane-forming solution.

Then, while keeping the temperature of the membrane-forming solution at 170° C., the membrane-forming solution was extruded from a double cylindrical tube nozzle to have a hollow shape, and ethylene glycol was simultaneously extruded as a bore liquid, and the membrane-forming solution was molded. The molded material was run by 15 mm in the air of ordinary temperature and subjected to drying treatment. Thereafter, the molded material was immersed in a coagulating bath of 30° C. filled with water and wound at 15 m/min using a roller, to fabricate a separation membrane. Thereafter, the separation membrane was subjected to water washing treatment. The separation membrane subjected to the above-described water washing treatment was subjected to heat treatment for 20 minutes in water of 70° C.

The outer diameter of the obtained separation membrane was 178 μm and the inner diameter thereof was 95 μm. The reverse osmosis performance of the obtained separation membrane as evaluated. As a result, the quantity of water permeation was 34 L/m²/day and the salt rejection was 95.0%.

The forward osmosis performance of the obtained separation membrane was evaluated. As a result, the quantity of water permeation as 3.5 L/m²/h.

The porosity of the obtained separation membrane was 62.0% and the pore distribution thereof was A=0.26.

Comparative Example 1

(Polymerization a SPAE)

Using the same method as that of Example 1, SPAE of DS=26.5% was obtained.

(Formation of Separation Membrane)

Using the same method as that of Example 1, a separation membrane was obtained except that NMP/EG=6/4 was used as the bore liquid. The obtained separation membrane was subjected to water washing treatment and heat treatment.

The outer diameter of the obtained separation membrane was 188 μm and the inner diameter thereof was 95 μm. The reverse osmosis performance of the obtained separation membrane was evaluated. As a result, the quantity of water permeation was 110 L/m²/day and the salt rejection was 52.2%.

The forward osmosis performance of the obtained separation membrane was evaluated. As a result, the quantity of water permeation was 2.4 L/m²/h.

The porosity of the obtained separation membrane was 87.4% and the pore distribution thereof was A=0.64.

Comparative Example 2

(Polymerization of SPAE)

Using the same method as that of Example 1, SPAE of DS=26.5% was obtained.

(Formation of Separation Membrane)

Using the same method as that of Example 1, a separation membrane was obtained. The obtained separation membrane was subjected to water washing treatment and then, was subjected to heat treatment at 98° C. in a 3.5 mass % sodium chloride aqueous solution for 20 minutes.

The outer diameter of the obtained separation membrane was 178 μm and the inner diameter thereof was 79 μm. The reverse osmosis performance of the obtained separation membrane was evaluated. As a result, the quantity of water permeation was 28 L/m²/day and the salt rejection was 98.2%.

The forward osmosis performance of the obtained separation membrane was evaluated. As a result, the quantity of water permeation was 0.2 L/m²/h.

The porosity of the obtained separation membrane was 51.2% and the pore distribution thereof was A=0.18.

Comparative Example 3

(Polymerization of SPAE)

Using the same method as that of Example 1, SPAE of DS=26.5% was obtained. Thereafter, SPAE was immersed and stirred for 48 hours in a sulfuric acid aqueous solution having a concentration adjusted to 2 mole/liter. SPAE thus obtained was sufficiently washed with water and dried, to convert a counter ion on a sulfonic acid group to a proton.

(Formation of Separation Membrane)

Using the same method as that of Example 1, a separation membrane was obtained except that the above-described polymer was used. The obtained separation membrane was subjected to water washing treatment and heat treatment.

The outer diameter of the obtained separation membrane was 185 μm and the inner diameter thereof was 90 μm. The reverse osmosis performance of the obtained separation membrane was evaluated. As a result, the quantity of water permeation was 130 L/m$^2$/day and the salt rejection was 62.0%.

The forward osmosis performance of the obtained separation membrane was evaluated. As a result, the quantity of water permeation was 2.6 L/m$^2$/h.

The porosity of the obtained separation membrane was 88.2% and the pore distribution thereof was A=0.22.

Comparative Example 4

(Polymerization of SPAE)
Using the same method as that of Example 1, SPAE of DS=26.5% was obtained.
(Formation of Separation Membrane)
Using the same method as that of Example 1, a membrane formation experiment of a separation membrane was performed except that a solution in which 85 mass % of N-methyl-2-pyrrolidone and 15 mass % of ethylene glycol were mixed was used as the bore liquid. However, breakage of the membrane occurred frequently and the membrane could not be formed.

Comparative Example 5

(Polymerization of SPAE)
Using the same method as that of Example 1, SPAE of DS=26.5% was obtained.
(Formation of Separation Membrane)
Using the same method as that of Example 1, a separation membrane was obtained except that the temperature of the membrane-forming solution was 150° C., ethylene glycol was used as the bore liquid, and a 3.5 mass % sodium chloride aqueous solution was used in the coagulating bath. The obtained separation membrane was subjected to water washing treatment and heat treatment.

The outer diameter of the obtained separation membrane was 188 μm and the inner diameter thereof was 93 μm. The reverse osmosis performance of the obtained separation membrane was evaluated. As a result, the quantity of water permeation was 38 L/m$^2$/day and the salt rejection was 92.0%.

The forward osmosis performance of the obtained separation membrane was evaluated. As a result, the quantity of water permeation was 2.0 L/m$^2$/h.

The porosity of the obtained separation membrane was 54.8% and the pore distribution thereof was A=0.20.

Comparative Example 6

(Polymerization of SPAE)
Using the same method as that of Example 1, SPAE of DS=26.5% was obtained.
(Formation of Separation Membrane)
Using the same method as that of Comparative Example 5, a separation membrane was obtained. The obtained separation membrane was subjected to water washing treatment, and then, was subjected to heat treatment at 98° C. in a 3.5 mass % sodium chloride aqueous solution for 20 minutes.

The outer diameter of the obtained separation membrane was 186 μm and the inner diameter thereof was 92 μm. The reverse osmosis performance of the obtained separation membrane was evaluated. As a result, the quantity of water permeation was 27 L/m$^2$/day and the salt rejection was 98.5%.

The forward osmosis performance of the obtained separation membrane was evaluated. As a result, the quantity of water permeation was 1.6 L/m$^2$/h.

The porosity of the obtained separation membrane was 50.8% and the pore distribution thereof was A=0.16.

TABLE 1

| | SPAE | | Membrane formation temperature | Bore liquid | | | |
| | | | | Type of solvent | | Composition of solvent | |
| | chemical structure | DS | ° C. | solvent | non-solvent | solvent (%) | non-solvent (%) |
| --- | --- | --- | --- | --- | --- | --- | --- |
| Example 1 | formulas (I) and (II) | 26.5 | 170 | NMP | EG | 30 | 70 |
| Example 2 | formulas (I) and (II) | 26.5 | 170 | NMP | EG | 50 | 50 |
| Example 3 | formulas (I) and (II) | 26.5 | 160 | NMP | EG | 30 | 70 |
| Example 4 | formulas (I) and (II) | 26.5 | 180 | NMP | EG | 30 | 70 |
| Example 5 | formulas (I) and (II) | 26.5 | 170 | NMP | EG | 30 | 70 |
| Example 6 | formulas (I) and (II) | 26.5 | 170 | NMP | EG | 30 | 70 |
| Example 7 | formulas (XII) and (XIII) | 26.5 | 170 | NMP | EG | 30 | 70 |
| Example 8 | formulas (I) and (II) | 20.0 | 170 | — | EG | 0 | 100 |
| Comparative Example 1 | formulas (I) and (II) | 26.5 | 170 | NMP | EG | 60 | 40 |
| Comparative Example 2 | formulas (I) and (II) | 26.5 | 170 | NMP | EG | 30 | 70 |
| Comparative Example 3 | formulas (I) and (II) M = H | 26.5 | 170 | NMP | EG | 30 | 70 |
| Comparative Example 4 | formulas (I) and (II) | 26.5 | 170 | NMP | EG | 85 | 15 |
| Comparative Example 5 | formulas (I) and (II) | 26.5 | 150 | NMP | EG | 0 | 100 |
| Comparative Example 6 | formulas (I) and (II) | 26.5 | 150 | NMP | EG | 0 | 100 |

TABLE 1-continued

| | Post-treatment conditions | | | Membrane dimension | | Reverse osmosis performance | | Forward osmosis performance | | Pore distribution |
|---|---|---|---|---|---|---|---|---|---|---|
| | Solution | Temperature °C. | Time min | Outer diameter μm | Inner diameter μm | Water permeability L/m²/day | NaCl removal rate % | Water permeability L/m²h | Porosity % | (A) — |
| Example 1 | water | 70 | 20 | 185 | 90 | 70 | 71.8 | 5.8 | 73.0 | 0.51 |
| Example 2 | water | 70 | 20 | 184 | 90 | 82 | 63.8 | 6.8 | 76.2 | 0.52 |
| Example 3 | water | 70 | 20 | 185 | 89 | 104 | 55.2 | 7.2 | 80.1 | 0.57 |
| Example 4 | water | 70 | 20 | 185 | 90 | 46 | 83.0 | 4.1 | 66.8 | 0.45 |
| Example 5 | water | 60 | 20 | 188 | 91 | 81 | 65.6 | 6.6 | 78.2 | 0.52 |
| Example 6 | water | 98 | 20 | 185 | 90 | 46 | 79.4 | 3.9 | 65.0 | 0.47 |
| Example 7 | water | 70 | 20 | 186 | 90 | 70 | 70.2 | 5.7 | 72.9 | 0.50 |
| Example 8 | water | 70 | 20 | 178 | 95 | 34 | 95.0 | 3.5 | 62.0 | 0.26 |
| Comparative Example 1 | water | 70 | 20 | 188 | 95 | 110 | 52.2 | 2.4 | 87.4 | 0.64 |
| Comparative Example 2 | 3.5% NaCl aqueous solution | 98 | 20 | 178 | 79 | 28 | 98.2 | 0.2 | 51.2 | 0.18 |
| Comparative Example 3 | water | 70 | 20 | 185 | 90 | 130 | 62.0 | 2.6 | 88.2 | 0.22 |
| Comparative Example 4 | membrane cannot be formed | | | | | | | | | |
| Comparative Example 5 | water | 70 | 20 | 188 | 93 | 38 | 92.0 | 2 | 54.8 | 0.20 |
| Comparative Example 6 | 3.5% NaCl aqueous solution | 70 | 20 | 185 | 92 | 27 | 98.5 | 1.6 | 50.8 | 0.16 |

*NMP: N-methyl-2-pyrrolidone, EG: ethylene glycol

INDUSTRIAL APPLICABILITY

Since the separation membrane of the present invention is composed of a material having high chemical durability so as to be combinable with various draw solutes and applicable to the forward osmosis treatment, and achieves both separability and water permeability at high level, the separation membrane of the present invention is extremely useful as a forward osmosis separation membrane.

The invention claimed is:

1. A separation membrane having a density gradient from an outer surface side to an inner surface side,
   a ratio between a thickness of a dense layer having a dense polymer density and a thickness of a coarse layer having a coarse polymer density being in a range of 0.25≤(the thickness of the coarse layer)/[(the thickness of the dense layer)+(the thickness of the coarse layer)] ≤0.6, when measuring polymer density distribution in a thickness direction of the separation membrane by Raman spectroscopy, and wherein
   the coarse polymer density increases toward the dense layer,
   the separation membrane comprises sulfonated poly(arylene ether) having a repeating structure of a hydrophobic segment represented by the following formula (I) and a hydrophilic segment represented by the following formula (II):

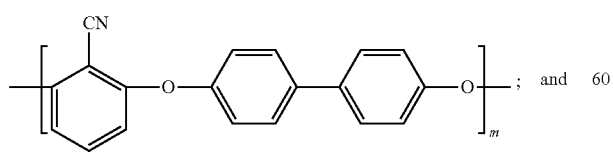

where m and n each represents a natural number equal to or greater than 1, $R^1$ and $R^2$ represent —$SO_3M$, M represents a metal element, and a ratio of sulfonation expressed as a percentage of the number of repetition of the formula (II) to a total of the number of repetition of the formula (I) and the number of repetition of the formula (II) in the sulfonated poly(arylene ether) copolymer is higher than 10% and lower than 50%.

2. The separation membrane according to claim 1, wherein
   a porosity of the separation membrane is 60 to 85%.

3. The separation membrane according to claim 1, wherein
   the separation membrane is for forward osmosis treatment.

4. The separation membrane according to claim 1, wherein
   the separation membrane is a hollow fiber membrane.

5. A separation membrane element having the separation membrane as recited in claim 1 incorporated therein.

6. A separation membrane module having one or more separation membrane elements as recited in claim 5 incorporated therein.

* * * * *